United States Patent Office 2,837,479
Patented June 3, 1958

---

2,837,479

FIRE-FIGHTING FOAMS AND METHODS OF PRODUCING THE SAME

James Derek Birchall, Leigh, England, assignor to John Kerr & Company (Manchester) Ltd., near Liverpool, England, a British company No Drawing. Application February 21, 1956
Serial No. 566,787

Claims priority, application Great Britain June 21, 1955

11 Claims. (Cl. 252—8.05)

The present invention relates to fire-fighting foams and methods of producing same, and more particularly to fire-fighting foams which are effective as well against the burning of water-soluble inflammable liquids such as alcohol, as against the burning of water-insoluble liquids such as petroleum and the like.

The present invention is a continuation-in-part of my copending application Serial No. 291,800, filed June 4, 1952, now abandoned, for "Production and Use of Foam for Fire-Fighting Purposes."

Foams for fire-fighting purposes are generally aqueous solutions of a foam-forming agent which may be a colloidal substance. The foam is produced as needed by mechanical agitator of a dilute solution of the foaming agent. Although such foams are effective against the burning of petroleum and other water-insoluble inflammable liquids, they are useless for extinguishing fires of completely water-soluble or partially water-soluble liquids such as ether, alcohols, acetone, etc. because the rate of breakdown of the foam when in contact with such liquids is extremely rapid. The above mentioned group of liquid inflammables are classified under class "C" liquids in the hazard classification.

It is therefore a primary object of the present invention to provide aqueous base foams for fire-fighting purposes which are stable when in contact with water-soluble liquids and which are therefore effective against the burning of completely or partially water-soluble inflammable liquids, the foams of the present invention being also, of course, suitable against the burning of water-insoluble inflammable liquids.

It is another object of the present invention to provide aqueous foam concentrates which may be directly transformed into foams for fire-fighting purposes by dilution and agitation with water, the foam thus produced being stable in contact with water-soluble inflammable liquids.

It is a further object of the present invention to provide a method of producing foams for fire-fighting purposes, which foams are particularly effective against the burning of inflammable liquids which are at least partly water-soluble.

Other objects and advantages of the present invention will be apparent from a further reading of the specification and of the appended claims.

With the above objects in view, the present invention mainly comprises an aqueous foam concentrate adapted to be transformed by mixing with water and agitation into a foam for fire-fighting purposes and being particularly suitable against burning of inflammable liquids which are at least partly water-soluble, the aqueous foam concentrate consisting essentially of water, at least one water-soluble derivative of alginic acid, a water-soluble electrolyte which does not react with the water-soluble derivative of alginic acid to form a water-insoluble derivative thereof, and a foam-forming agent for fire-fighting purposes non-chemically reactive with the water-soluble alginic acid derivative and with the water-soluble electrolyte and being dissolved in the water in an amount sufficient to cause formation of a foam when diluted with a predetermined amount of water and mechanically agitated therewith, the water-soluble electrolyte being present in an amount sufficient on the one hand to cause salting-out of the water-soluble derivative of alginic acid in the aqueous foam concentrate and insufficient on the other hand to prevent dissolution of the water-soluble derivative of alginic acid when the aqueous foam concentrate is diluted with the predetermined amount of water, whereby upon formation of a foam by dilution and agitation of the aqueous foam concentrate with the predetermined amount of water the foam bubbles are stabilized against the action of water-soluble inflammables by the alginic acid derivatives in contact with the foam bubbles.

As indicated above, the use of fire-fighting foams for blanketing fires of inflammable liquids is of course well known. With fires of petroleum or other water-insoluble liquids these foams have been most effective, but where the fires are concerned with inflammable water-soluble liquids such as ether, alcohols or the like, it was found that the foam collapsed on contact with the water-soluble organic liquid. It is furthermore particularly desirable to have the foaming agent available in the form of a concentrate which is introduced into a water stream and mechanically treated so as to bring about the necessary foam. Attempts were made to avoid the difficulty with respect to water soluble liquid inflammables by incorporating into the foam concentrate an agent which would have the effect of stabilizing the foam in the presence of water-soluble inflammable liquids. However, the viscosity of concentrates prepared in this manner was so high as to render such concentrates substantially inoperative in actual practice.

Therefore, the present invention provides for elimination of this difficulty by maintaining the stabilizing agent in suspension in the concentrate in such manner that when the concentrate is diluted for the formation of the foam, the stabilizing agent goes into solution and when the foam is formed upon agitation of the dilute solution, the stabilizing agent has the effect of forming a film on the bubbles of the foam which stabilizes the foam bubbles and prevents breakdown of the foam by the water-soluble organic liquid inflammable.

This is accomplished in accordance with the present invention by the use of a water-soluble alginic acid derivative, for example sodium alginate, potassium alginate, ammonium alginate and other soluble salts of alginic acid, as well as water-soluble organic derivates of alginic acid such as esters and partial esters of alginic acid including methyl and ethyl esters of alginic acid. The preferred water-soluble derivatives of alginic acid according to the present invention are sodium alginate and ammonium alginate, and most preferably a mechanical mixture of sodium and ammonium alginates or the double sodium and ammonium alginate salt (prepared by neutralizing alginic acid with a mixture of sodium carbonate and ammonium hydroxide). Such mixture of sodium and ammonium alginates may be used to prepare very stable suspensions in which the disperse phase neither creams nor sediments.

The amount of the water-soluble alginic acid derivative in the aqueous foam concentrate may vary depending upon the particular derivative utilized, the particular foaming agent, the amount of water with which the aqueous foam concentrate is to be diluted before formation of the foam, etc. Generally, the amount of the alginic acid derivative is between 4–10% by weight of the aqueous foam concentrate, and most preferably 6–8% by weight.

Any water-soluble electrolyte which does not react with the water-soluble derivative of alginic acid to form a water-insoluble derivative thereof may be utilized to salt out the water-soluble alginic acid derivative in the aqueous foam concentrate. Thus the metallic ion of the electrolyte salt must not be an ion such as calcium or the like which would form insoluble calcium alginate, since if the alginic acid derivative were rendered insoluble it could not be dissolved when the aqueous foam concentrate is diluted with water and therefore it would not have the effect of stabilizing the produced foam.

In general, salts of sodium, potassium and ammonium are most preferred as the water-soluble electrolyte, e. g. sodium chloride, potassium chloride, ammonium chloride, sodium sulfate, potassium sulfate, ammonium sulfate, and other soluble salts thereof. Sodium chloride and ammonium chloride are of course the most preferred salts for the purposes of the present invention. The salt utilized should not be such as would lower the pH value of the aqueous foam concentrate below 3, and most preferably the pH of the final aqueous foam concentrate of the present invention should be between 4 and 7, although these limits are not critical.

As indicated above, the amount of the water-soluble electrolyte in the aqueous foam concentrate is such as to be sufficient on the one hand to salt-out the water-soluble alginic acid derivative in the aqueous foam concentrate and insufficient on the other hand to prevent dissolution of the water-soluble alginic acid derivative when the aqueous foam concentrate is diluted with the water prior to the formation of the foam. In general, the amount of the electrolyte salt in the aqueous foam concentrate is between 8–25% by weight of the aqueous foam concentrate, and preferably between 12–14% by weight.

Any foaming agent adapted to form a foam for firefighting purposes may be utilized which suffers no reduction in foaming properties in the presence of electrolytes and which contains no metal ions which would combine with the alginate to form a water-insoluble alginate. Thus, foam-forming agents of the detergent and wetting agent types may be utilized in accordance with the present invention. In addition, other foam-forming agents such as saponin, gelatin and the like may also be utilized. The most preferred foam-forming agents according to the present invention are the protein hydrolysates such as those produced by the alkaline hydrolysis of animal blood, followed by neutralization.

Protein hydrolysates of this type may already contain electrolyte salts if the hydrolysis is carried out for example by means of sodium hydroxide and the neutralization by hydrochloric acid, thus resulting in the formation of sodium chloride. This solution may be then further neutralized with ammonia so that the final protein hydrolysate foaming agent will also contain ammonium chloride. The commercial product sold under the name "Nicerol" is a suitable protein hydrolysate foaming agent for the purposes of the present invention.

The amount of the foaming agent in the aqueous foam concentrate may vary greatly depending upon the particular foaming agent, the amount of electrolyte salt, the amount of water-soluble alginic acid derivatives to be used, and mainly upon the amount of water with which the aqueous foam concentrate is to be diluted before forming the foam. Generally the amount of the foaming agent, particularly in the case of the protein hydrolysate foaming agents, is between 40% to 100% by volume of the volume of the water in the aqueous foam concentrate.

The foam is formed according to the present invention by diluting the aqueous foam concentrate of the present invention with a predetermined amount of water and mechanically agitating the same. The agitation may be accomplished by any suitable means, e. g. by blowing the solution through nozzles, by aerating, etc. The amount of water with which the aqueous foam concentrate is diluted upon formation of the foam may vary within very wide limits. Generally the amount of water with which the aqueous foam concentrate is diluted is between 10 and 17 times the volume of water of the aqueous foam concentrate, and most preferably between 15 and 16 times the amount of water of the aqueous foam concentrate. Greater or lesser degrees of dilution with the water may be utilized depending upon the particular foaming agent, the concentration of the foaming agent in the concentrate, etc., but the best results are achieved when the dilution is maintained within the above limits.

It has been found that the formation of a precipitate on or in the bubble-walls of a foam renders the foam to a certain extent stable against breakdown by inflammable water-soluble liquids. This may perhaps be attributed to the cohesion of water molecules in the bubbles to the particles distributed on or in the bubble-walls, so that the power of the inflammable solvent to withdraw water from the bubble-wall is reduced. The precipitate may be of many types, granular, flocculent, or gelatinous. It is found, however, that gelatinous precipitates give the best results and these, in particular, are excellent when the precipitate takes the form of a continuous film of gel on the bubble-wall. When such a film is obtained, as it is according to the present invention and is present in the outer surface of the bubble-wall, there is obviously a physical barrier between the foam and the hazardous solvent, which effectively prevents interaction between them; also, the complex and interlaced gel structure holds water molecules and prevents their withdrawal by the solvent. The most efficient stabilizing is accomplished by the light gelatinous films from the water soluble alignates of the present invention, and more especially when they are formed only at the time that the foam compound, containing a suitable gelling agent, contacts the inflammable solvent.

It has been discovered that agents such as the alginates tend to hydrate (absorb water) when dispersed in an aqueous medium and this hydration leads to a decrease in density resulting in increased suspension stability. It is therefore preferred to use as a raw material for addition to the concentrate wet sodium alginate—that is the alginate from the stage of the production process before drying—so that maximum hydration is attained before the dispersion is prepared.

In its simplest form the process for the production of the improved foam-compound from a prepared concentrate consists in roughly dispersing the powdered alginate in a foam-compound concentrate containing sufficient dissolved electrolyte, such as sodium and ammonium chloride, to render the alginate insoluble. This rough dispersion is then passed through a colloid mill to prepare the final stable suspension, and a small percentage of a stabilizing agent may be present. Alternatively, the rough dispersion may be treated by other known colloidal techniques—for example it may be passed through an homogeniser or subjected to the action of ultra-sonic radiation, the object in every case being to reduce the particle size of the suspended alginate.

Colloid mill and homogeniser treatment possess one disadvantage absent in the case of ultra-sonic radiation and that is that the rough dispersion of agent in the aqueous foam-compound tends to aerate due to the mechanical agitation. However, this may be avoided by milling the alginate in the form of a paste with brine and then dispersing the paste in the foam-compound by gentle mechanical stirring in the absence of air or using such appliances (e. g. non-vertex stirrers) which cause no entrainment.

The aqueous foam concentrates of the present invention are generally prepared as follows: The alginic acid derivative, dry and in a powdered condition is charged into a rotary ball-mill together with the normal compliment of stones. The mill is rotated several times to mix stones and alginate and then slowly filled with the foam compound which is an aqueous solution of the protein hydrolysate and electrolyte salts such as sodium chloride and ammonium chloride, care being taken that no air is entrained. The mill is filled to the brim. The mill is sealed and rotated for a time. It is found that the alginate is reduced in size, is hydrated and remains suspended in the aqueous solution until diluted at the time of use when the salt concentration falls and the alginate dissolves.

Except for variation in the concentration of the different agents, the following variations are possible in the method of forming the aqueous foam concentrate.

The method as above is employed except that, after the alginate has been introduced into the mill and the former rotated to mix stones and alginate, the mill is evacuated to remove any air. The foam compound which is an aqueous solution of the protein hydrolysate and electrolyte salts such as sodium chloride and ammonium chloride is introduced into the mill while it is in the evacuated state. The final product is thus completely free from entrained air which may result in flotation of the particles. This method does not alter the concentration conditions.

The alginate is milled in the aqueous foam concentrate in order to reduce the particle size of the salted-out alginate as much as possible. This results in better dispersement of the alginate and also facilitates the dissolution of the alginate when the aqueous foam concentrate is diluted with water for the formation of the foam. Preferably the particle size of the alginate in the aqueous foam concentrate is less than 20µ.

The following examples illustrate the method of forming the aqueous foam concentrate of the present invention, the scope of the invention however, not being limited to the specific details of the examples.

Example I 60 lbs. of wet sodium alginate containing 40% moisture (this moisture content varies with the manufacturer's batch and this could be adjusted accordingly) is added to 12 lbs. of sodium chloride in 5 gallons of water. The mixture is passed through a colloid mill (preferably with abrasive working surface) and then reduced to a paste. To this thick paste, 40 lbs. of foam-compound (hydrolysed animal blood containing 12% sodium chloride and ammonium chloride) is added, the resultant mixture again being passed through the colloid mill, the product being a smooth paste in which the particle size of the disperse phase is uniform and small, the size of the particle being on the average less than 20µ. To complete the process this paste is then diluted with an equal weight of the same foam-compound containing 12% sodium and ammonium chloride, precaution being taken that foaming does not take place. To prevent foaming of the product at this final stage, agitation may be arranged to take place in the absence of air—e. g. by mechanical stirring in an enclosed tank completely filled with liquid or by pumping the liquid round an airtight circuit, placing baffles at some point for agitation.

Example II

An aqueous foam concentrate is prepared so as to have the following composition:
Water _____gal__ 1
Protein hydrolysate _____oz__ 52
Sodium alginate _____oz__ 8
Sodium chloride _____oz__ 15

The powdered alginate is charged into a rotary ball-mill. The mill is rotated several times to mix the alginate and the stones. The foam agent (diluted hydrolysate and salts) is slowly added so as to entrain no air and the ball-mill completely filled. It is then sealed and rotated for 2 hours.

Example III

Utilizing the same method of preparation as in Example II, an aqueous foam concentrate is prepared having the following composition:
Water _____gal__ 1
Protein hydrolysate _____oz__ 125
Ammonium alginate _____oz__ 8
Sodium chloride _____oz__ 20
Ammonium chloride _____oz__ 20

Example IV

Utilizing the same method of preparation as in Example II, an aqueous foam concentrate is prepared having the following composition:
Water _____gal__ 1
Protein hydrolysate _____oz__ 100
Sodium alginate _____oz__ 12
Sodium sulfate _____oz__ 15
Ammonium sulfate _____oz__ 15

The material from the final stage of the process outlined above may be screened and any clumps may be returned to the paste milling stage. If, on examination the particle size of the disperse phase of the paste is observed to be too large, the paste may be remilled.

It has been observed that stable suspensions may be prepared without the use of mechanical means of particle size reduction by dispersing by simple agitation of sodium alginate (or any other water-soluble alginic acid derivative) in an aqueous solution of a protein hydrolysate containing a concentration of electrolytes in excess of that required to render the alginate insoluble. For example, if finely milled sodium alginate is stirred into a foam-compound consisting of a protein hydrolysate containing 25% of sodium chloride, a stable suspension is prepared.

It is known that in dilute solution, protein hydrolysate foam-compounds tend to deposit a sludge on standing, and this is a disadvantage. It has been found that the addition of a gelling agent to such a dilute solution effectively prevents such sludge formation. The solutions thus produced are both stable on standing, and foam produced from them is stable relative to partially or completely water-soluble organic solvents.

Suspensions of alginic acid derivatives in foam-compounds of the protein hydrolysate type may be given additional stability by the presence of 0.1 to 1% of a wetting agent. Any suitable wetting agent may be utilized for this purpose, e. g. the commercial product "Perminal W" which is a mixture of 50% sulfonated isopropylated mineral oil fraction with 50% sodium chloride.

The foam-concentrates produced according to this invention may be used to combat fires of inflammable liquids soluble and insoluble in water. The compounds may be used by any of the known techniques for the application of foam such as foam-making branchpipes, foam-pumps etc. An interesting and important feature of the invention is that the new foam concentrates give a foam suitable for base injection into tanks of inflammable water-soluble liquids, and the stability of the foam is such that it is not destroyed on rising through a head of a liquid such as acetone. Many large vertical liquid storage tanks are fitted so that foam can be injected into the base of the tank through the product lines. Once it has entered the tank, the foam rises through the liquid to the surface thereof. This method of applying the improved foam has many advantages, e. g. increased heat stability due to gelling on contact with solvent as it rises through the liquid.

The foam produced from concentrates manufactured according to this invention have good cooling properties due to the thick bubble walls characteristic of the foam. Accordingly the improved foam is very suitable for combating fires of solid materials (class A fires), and as gel formation takes place on heating, a high water content light residue remains on the material effectively preventing reignition.

The improved foam can be employed to combat fires of all classes of inflammable liquid.

The agents described above may be incorporated in chemical foam mixtures, though in general this is not as good a method as the incorporation in mechanical foam mixtures. As an example, the incorporation of sodium alginate into a chemical foam mixture containing aluminium sulphate, sodium bicarbonate and a foam stabilising agent such as saponin, will result in the formation of a precipitate of aluminium alginate and this will result in the foam having a much increased resistance to completely or partially water-soluble organic solvents.

The following examples are given to illustrate the method of actually forming the foam for fire-fighting purposes according to the present invention.

*Example V*

A foam compound concentrate of the composition described under Example I (column 5) is employed. This foam compound is diluted with 16 times its volume of water. The dilute solution may be contained in a chamber adapted to be pressurised by gas so that the solution is forced out through a length of hose and aerated by means of a foam-making branchpipe. This method is adapted to small fixed installations and to portable apparatus.

*Example VI*

A foam compound concentrate of the composition described under Example III (column 6) is employed. This concentrate may be diluted with water at the time of use by means of a foam-making branchpipe adapted to induce 6% v./v. of concentrate into the water-stream. The knapsack tank and No. 2 foam-making branchpipe are specially adapted for this type of application.

*Example VII*

A foam compound concentrate of the composition described under Examples II and III may be used through such appliances as inline inductors, adapted to feed into a water stream a (within limits) controllable percentage of foam compound concentrate. In general the percentage would be 6% v./v.

In general foam compounds prepared according to the invention may be applied by any of the normal and known techniques of foam production; and reference may be made to the Manual of Firemanship, part I (page 170), published by Her Majesty's Stationary Office, London, England.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

I claim:

1. An aqueous foam concentrate adapted to be transformed by mixing with water and agitation into a foam for fire-fighting purposes and being particularly suitable against burning of inflammable liquids which are at least partly water-soluble, said aqueous foam concentrate consisting essentially of water; at least one water-soluble derivative of alginic acid; a water-soluble electrolyte which does not react with said water-soluble derivative of alginic acid to form a water-insoluble derivative thereof; and a foam-forming agent for fire-fighting purposes non-chemically reactive with said water-soluble alginic acid derivative and with said water-soluble electrolyte and being dissolved in said water in an amount sufficient to cause formation of a foam when diluted with a predetermined amount of water and mechanically agitated therewith, said water-soluble electrolyte being present in an amount sufficient on the one hand to cause salting-out of said water-soluble derivative of alginic acid in said aqueous foam concentrate and insufficient on the other hand to prevent dissolution of said water-soluble derivative of alginic acid when said aqueous foam concentrate is diluted with said predetermined amount of water, whereby upon formation of a foam by dilution and agitation of said aqueous foam concentrate with said predetermined amount of water the foam bubbles are stabilized against the action of water-soluble inflammables by said alginic acid derivative in contact with the foam bubbles.

2. An aqueous foam concentrate adapted to be transformed by mixing with water and agitation into a foam for fire-fighting purposes and being particularly suitable against burning of inflammable liquid which are at least partly water-soluble, said aqueous foam concentrate consisting essentially of water; at least one water-soluble derivative of alginic acid selected from the group consisting of sodium alginate and ammonium alginate; a water-soluble electrolyte which does not react with said water-soluble derivative of alginic acid to form a water-insoluble derivative thereof; and a foam-forming agent for fire-fighting purposes non-chemically reactive with said water-soluble alginic acid derivative and with said water-soluble electrolyte and being dissolved in said water in an amount sufficient to cause formation of a foam when diluted with a predetermined amount of water and mechanically agitated therewith, said water-soluble electrolyte being present in an amount sufficient on the one hand to cause salting-out of said water-soluble derivative of alginic acid in said aqueous foam concentrate and insufficient on the other hand to prevent dissolution of said water-soluble derivative of alginic acid when said aqueous foam concentrate is diluted with said predetermined amount of water, whereby upon formation of a foam by dilution and agitation of said aqueous foam concentrate with said predetermined amount of water the foam bubbles are stabilized against the action of water-soluble inflammables by said alginic acid derivative in contact with the foam bubbles.

3. An aqueous foam concentrate adapted to be transformed by mixing with water and agitation into a foam for fire-fighting purposes and being particularly suitable against burning of inflammable liquids which are at least partly water-soluble, said aqueous foam concentrate consisting essentially of water; at least one water-soluble derivative of alginic acid selected from the group consisting of sodium alginate and ammonium alginate; a water-soluble electrolyte which does not react with said water-soluble derivative of alginic acid to form a water-insoluble derivative thereof; and a protein hydrolysate as foam-forming agent for fire-fighting purposes non-chemically reactive with said water-soluble alginic acid derivative and with said water-soluble electrolyte in an amount of 40% to 100% by volume of the volume of said water, said amount being sufficient to cause formation of a foam when diluted with a predetermined amount of water and mechanically agitated therewith, said water-soluble electrolyte being present in an amount sufficient on the one hand to cause salting-out of said water-soluble derivative of alginic acid in said aqueous foam concentrate and insufficient on the other hand to prevent dissolution of said water-soluble derivative of alginic acid when said aqueous foam concentrate is diluted with said predetermined amount of water, whereby upon formation of a foam by dilution and agitation of said aqueous foam concentrate with said predetermined amount of water the foam bubbles are stabilized against the action of water-soluble inflammables by said alginic acid derivative in contact with the foam bubbles.

4. An aqueous foam concentrate adapted to be transformed by mixing with water and agitation into a foam for fire-fighting purposes and being particularly suitable against burning of inflammable liquids which are at least partly water-soluble, said aqueous foam concentrate consisting essentially of water; at least one water-soluble derivative of alginic acid in an amount of 4–10% by weight; a water-soluble electrolyte which does not react with said water-soluble derivative of alginic acid to form a water-insoluble derivative thereof; and a foam-forming agent for fire-fighting purposes non-chemically reactive with said water-soluble alginic acid derivative and with said water-soluble electrolyte and being dissolved in said water in an amount sufficient to cause formation of a foam when diluted with a predetermined amount of water and mechanically agitated therewith, said water-soluble electrolyte being present in an amount sufficient on the one hand to cause salting-out of said water-soluble derivative of alginic acid in said aqueous foam concentrate and insufficient on the other hand to prevent dissolution of said water-soluble derivative of alginic acid when said aqueous foam concentrate is diluted with said predetermined amount of water, whereby upon formation of a foam by dilution and agitation of said aqueous foam concentrate with said predetermined amount of water the foam bubbles are stabilized against the action of water-soluble inflammables by said alginic acid derivative in contact with the foam bubbles.

5. An aqueous foam concentrate adapted to be transformed by mixing with water and agitation into a foam for fire-fighting purposes and being particularly suitable against burning of inflammable liquids which are at least partly water-soluble, said aqueous foam concentrate consisting essentially of water; at least one water-soluble derivative of alginic acid in an amount of 6–8% by weight; a water-soluble electrolyte which does not react with said water-soluble derivative of laginic acid to form a water-insoluble derivative thereof; and a foam-forming agent for fire-fighting purposes non-chemically reactive with said water-soluble alginic acid derivative and with said water-soluble electrolyte in an amount of 40% to 100% by volume of the volume of said water, said amount being sufficient to cause formation of a foam when diluted with a predetermined amount of water and mechanically agitated therewith, said water-soluble electrolyte being present in an amount sufficient on the one hand to cause salting-out of said water-soluble derivative of alginic acid in said aqueous foam concentrate and insufficient on the other hand to prevent dissolution of said water-soluble derivative of alginic acid when said aqueous foam concentrate is diluted with said predetermined amount of water, whereby upon formation of a foam by dilution and agitation of said aqueous foam concentrate with said predetermined amount of water the foam bubbles are stabilized against the action of water-soluble inflammables by said alginic acid derivative in contact with the foam bubbles.

6. An aqueous foam concentrate adapted to be transformed by mixing with water and agitation into a foam for fire-fighting purposes and being particularly suitable against burning of inflammable liquids which are at least partly water-soluble, said aqueous foam concentrate consisting essentially of water; at least one water-soluble derivative of alginic acid; a water-soluble electrolyte which does not react with said water-soluble derivative of alginic acid to form a water-insoluble derivative thereof and being selected from the group consisting of sodium, potassium and ammonium salts; and a foam-forming agent for fire-fighting purposes non-chemically reactive with said water-soluble alginic acid derivative and with said water-soluble electrolyte and being dissolved in said water in an amount sufficient to cause formation of a foam when diluted with a predetermined amount of water and mechanically agitated therewith, said water-soluble electrolyte being present in an amount sufficient on the one hand to cause saltin-out of said water-soluble derivative of alginic acid in said aqueous foam concentrate and insufficient on the other hand to prevent dissolution of said water-soluble derivative of alginic acid when said aqueous foam concentrate is diluted with said predetermined amount of water, whereby upon formation of a foam by dilution and agitation of said aqueous foam concentrate with said predetermined amount of water the foam bubbles are stabilized against the action of water-soluble inflammables by said alginic acid derivative in contact with the foam bubbles.

7. An aqueous foam concentrate adapted to be transformed by mixing with water and agitation into a foam for fire-fighting purposes and being particularly suitable against burning of inflammable liquids which are at least partly water-soluble, said aqueous foam concentrate consisting essentially of water; at least one water-soluble derivative of alginic acid; a water-soluble electrolyte which does not react with said water-soluble derivative of alginic acid to form a water-insoluble derivate thereof; and a foam-forming agent for fire-fighting purposes non-chemically reactive with said water-soluble alginic acid derivative and with said water-soluble electrolyte and being disolved in said water in an amount sufficient to cause formation of a foam when diluted with a predetermined amount of water and mechanically agitated therewith, said water-soluble electrolyte being present in an amount of 8–25% by weight of said aqueous foam concentrate so that the amount of said electrolyte is sufficient on the one hand to cause salting-out of said water-soluble derivative of alginic acid in said aqueous foam concentrate and insufficient on the other hand to prevent dissolution of said water-soluble derivative of alginic acid when said aqueous foam concentrate is diluted with said predetermined amount of water, whereby upon formation of a foam by dilution and agitation of said aqueous foam concentrate with said predetermined amount of water the foam bubbles are stabilized against the action of water-soluble inflammables by said alginic acid derivative in contact with the foam bubbles.

8. An aqueous foam concentrate adapted to be transformed by mixing with water and agitation into a foam for fire-fighting purposes and being particularly suitable against burning of inflammable liquids which are at least partly water-soluble, said aqueous foam concentrate consisting essentially of water; at least one water-soluble derivative of alginic acid in an amount of 6–8% by weight; a water-soluble electrolyte which does not react with said water-soluble derivative of alginic acid to form a water-insoluble derivative thereof; and a foam-forming agent for fire-fighting purposes non-chemically reactive with said water-soluble alginic acid derivative and with said water-soluble electrolyte in an amount of 40% to 100% by volume of the volume of said water, said amount being sufficient to cause formation of a foam when diluted with a predetermined amount of water and mechanically agitated therewith, said water-soluble electrolyte being present in an amount of 8–25% by weight of said aqueous foam concentrate so that the amount of said electrolyte is sufficient on the one hand to cause salting-out of said water-soluble derivative of alginic acid in said aqueous foam concentrate and insufficient on the other hand to prevent dissolution of said water-soluble derivative of alginic acid when said aqueous foam concentrate is diluted with said predetermined amount of water, whereby upon formation of a foam by dilution and agitation of said aqueous foam concentrate with said predetermined amount of water the foam bubbles are stabilized against the action of water-soluble inflammables by said alginic acid derivative in contact with the foam bubbles.

9. An aqueous foam concentrate adapted to be transformed by mixing with water and agitation into a foam for fire-fighting purposes and being particularly suitable against burning of inflammable liquids which are at least partly water-soluble, said aqueous foam concentrate consisting essentially of water; at least one water-soluble derivative of alginic acid; a water-soluble electrolyte which does not react with said water-soluble derivative of alginic acid to form a water-insoluble derivative thereof; and a foam-forming agent for fire-fighting purposes non-chemically reactive with said water-soluble aginic acid derivative and with said water-soluble electrolyte and being dissolved in said water in an amount sufficient to cause formation of a foam when diluted with a predetermined amount of water and mechanically agitated therewith, said water-soluble electrolyte being present in an amount sufficient on the one hand to cause salting-out of said water-soluble derivative of alginic acid in said aqueous foam concentrate and insufficient on the other hand to prevent dissolution of said water-soluble derivative of alginic acid when said aqueous foam concentrate is diluted with said predetermined amount of water, said salted-out derivative of alginic acid having in said aqueous foam concentrate a particle size of less than 20 $\mu$, whereby upon formation of a foam by dilution and agitation of said aqueous foam concentrate with said predetermined amount of water the foam bubbles are stabilized against the action of water-soluble inflammables by said alginic acid derivative in contact with the foam bubbles.

10. A method of producing an aqueous foam for fire-fighting purposes and being particularly suitable against burning of inflammables which are at least partly water-soluble, comprising the steps of forming an aqueous foam concentrate consisting essentially of water, at least one water-soluble derivative of alginic acid, a water-soluble electrolyte which does not react with said water-soluble derivative of alginic acid to form a water-insoluble derivative thereof, and a foam-forming agent for fire-fighting purposes non-chemically reactive with said water-soluble alginic acid derivative and with said water-soluble electrolyte and being dissolved in said water in an amount sufficient to cause formation of a foam when diluted with a predetermined amount of water and mechanically agitated therewith, said water-soluble electrolyte being present in an amount sufficient on the one hand to cause salting-out of said water-soluble derivative of alginic acid in said aqueous foam concentrate and insufficient on the other hand to prevent dissolution of said water-soluble derivative of alginic acid when said aqueous foam concentrate is diluted with said predetermined amount of water, whereby upon formation of a foam by dilution and agitation of said aqueous foam concentrate with said predetermined amount of water the foam bubbles are stabilized against the action of water-soluble inflammables by said alginic acid derivative in contact with the foam bubbles; and mixing and agitating said aqueous foam concentrate with said predetermined amount of water, thereby forming a stable foam.

11. A method of producing an aqueous foam for fire-fighting purposes and being particularly suitable against burning of inflammables which are at least partly water-soluble, comprising the steps of forming an aqueous foam concentrate consisting essentially of water, at least one water-soluble derivative of alginic acid selected from the group consisting of sodium alginate and ammonium alginate in an amount of 4–10% by weight, a water-soluble electrolyte which does not react with said water-soluble derivative of alginic acid to form a water-insoluble derivative thereof, and a protein hydrolysate as foam-forming agent for fire-fighting purposes non-chemically reactive with said water-soluble alginic acid derivative and with said water-soluble electrolyte in an amount of 40% to 100% by volume of the volume of said water, said amount being sufficient to cause formation of a foam when diluted with a predetermined amount of water and mechanically agitated therewith, said water-soluble electrolyte being present in an amount of 8–25% by weight of said aqueous foam concentrate so that the amount of said electrolyte is sufficient on the one hand to cause salting-out of said water-soluble derivative of alginic acid in said aqueous foam concentrate and insufficient on the other hand to prevent dissolution of said water-soluble derivative of alginic acid when said aqueous foam concentrate is diluted with said predetermined amount of water, whereby upon formation of a foam by dilution and agitation of said aqueous foam concentrate with said predetermined amount of water the foam bubbles are stabilized against the action of water-soluble inflammables by said alginic acid derivative in contact with the foam bubbles; and mixing and agitating said aqueous foam concentrate with said predetermined amount of water, thereby forming a stable foam.

References Cited in the file of this patent

UNITED STATES PATENTS

| | | |
|---|---|---|
| 1,247,803 | Erwin et al. | Nov. 27, 1917 |
| 2,478,988 | Wallerstein | Aug. 16, 1949 |
| 2,754,268 | Morway et al. | July 10, 1956 |